Sept. 18, 1945.  C. GREGORY  2,385,270
BOOT AND SHOE STRETCHING DEVICES
Filed Dec. 11, 1941  5 Sheets-Sheet 2
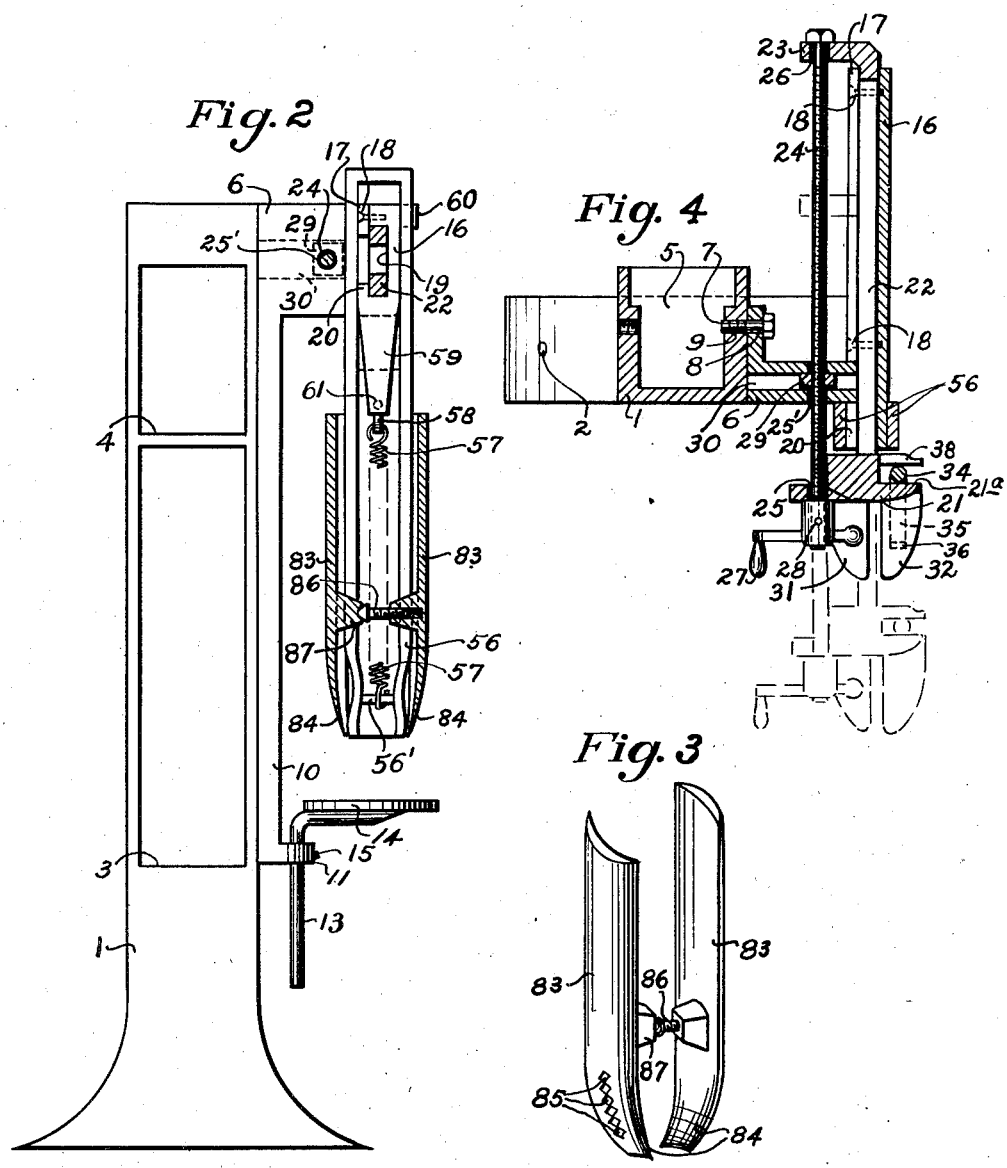

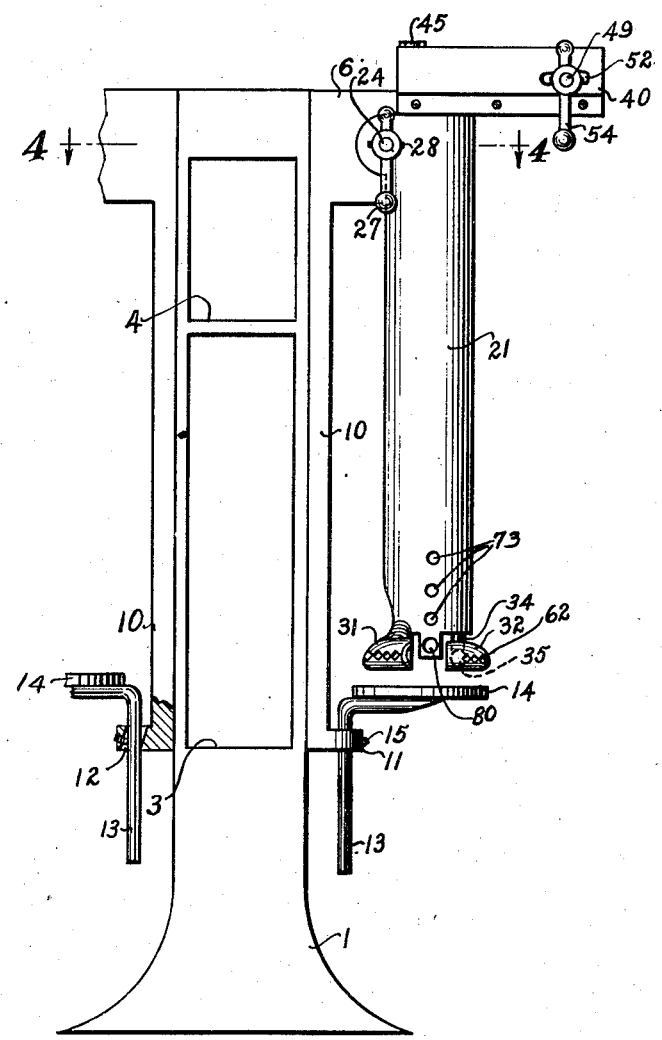

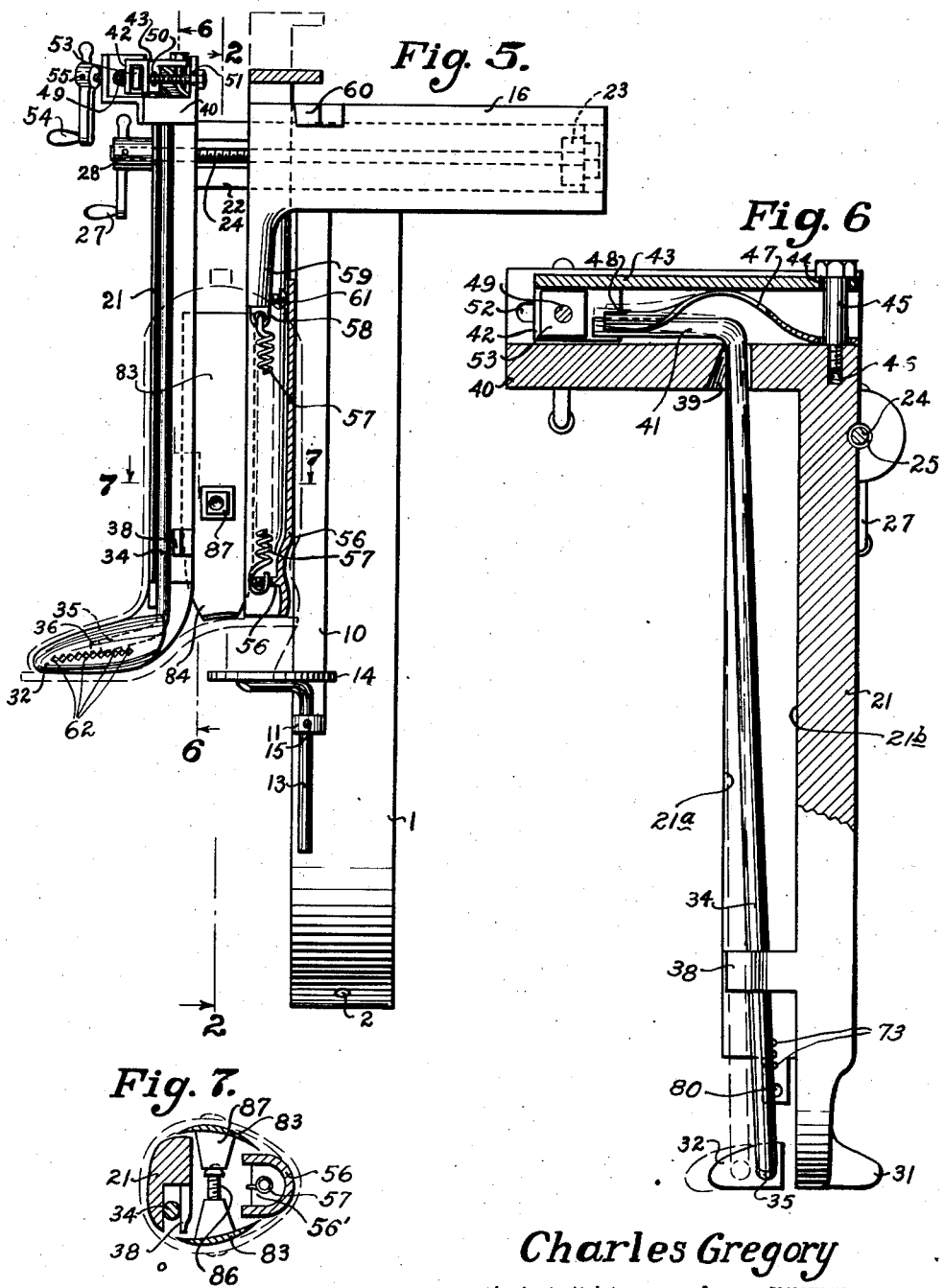

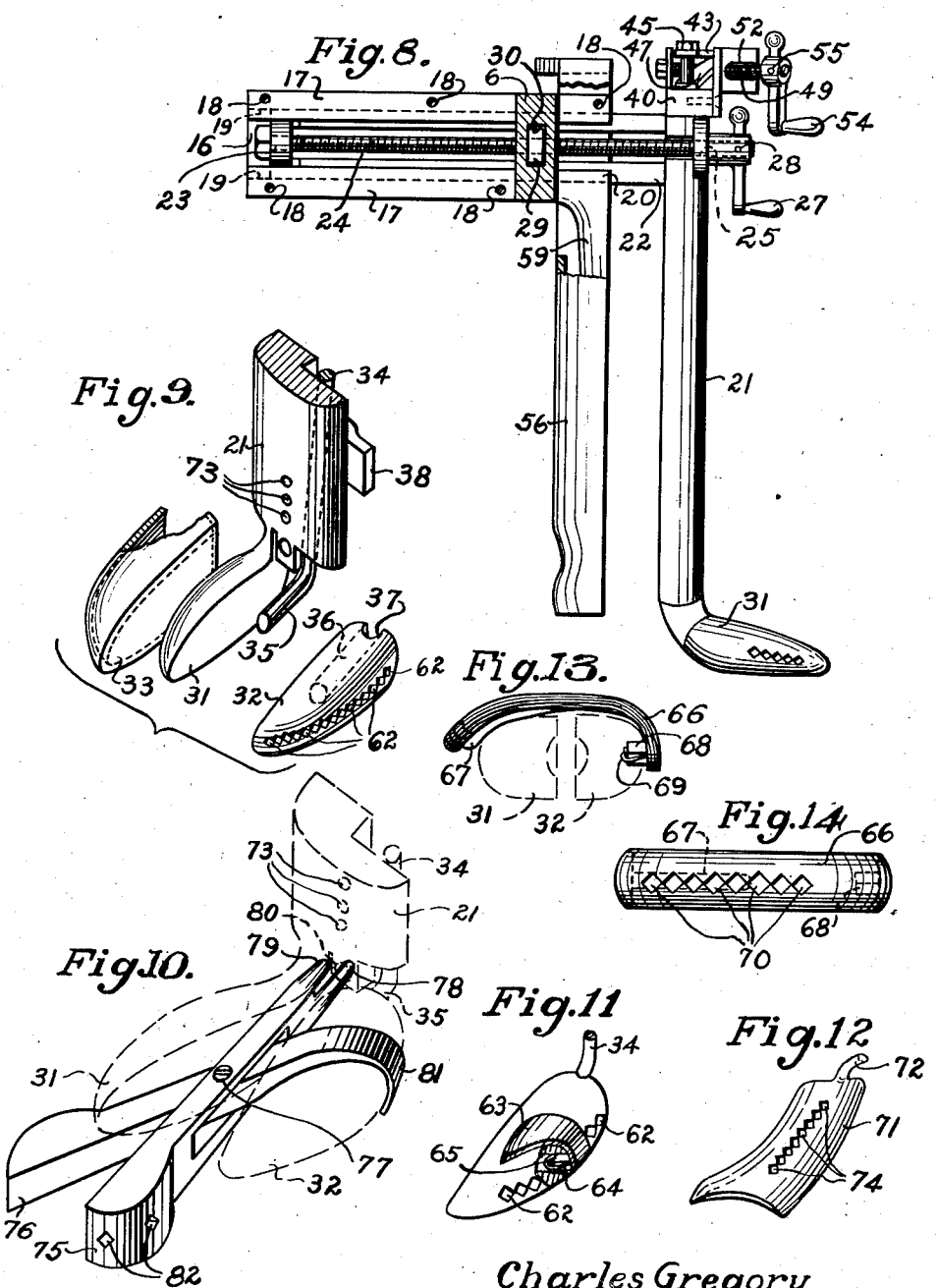

Sept. 18, 1945.  C. GREGORY  2,385,270
BOOT AND SHOE STRETCHING DEVICES
Filed Dec. 11, 1941   5 Sheets-Sheet 5
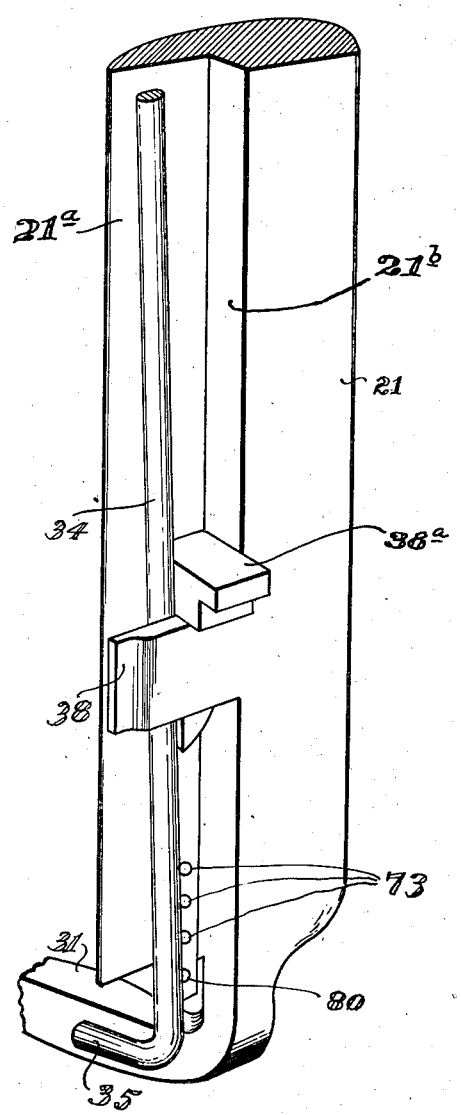
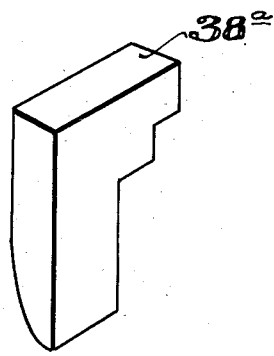
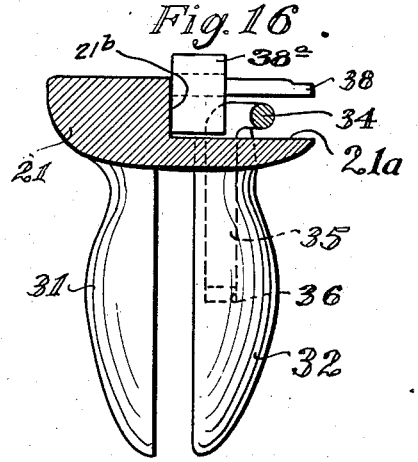
Charles Gregory
INVENTOR.
BY
ATTORNEY.

Patented Sept. 18, 1945

2,385,270

UNITED STATES PATENT OFFICE 2,385,270

BOOT AND SHOE STRETCHING DEVICE

Charles Gregory, Amarillo, Tex., now by judicial change of name to Charles Gregory Hilton Application December 11, 1941, Serial No. 422,572

34 Claims. (Cl. 12—128.6)

This invention relates to an improvement in boot and shoe stretching devices, of the character shown in my prior patent, No. 2,170,754, granted August 22, 1939, on Combination boot and shoe stretching and lengthening device.

As set forth in my prior patent, the device required the operator to be located at the back of the machine, on the opposite side thereof from the shoes to be stretched or adjusted, which was objectionable, because it made it necessary for the operator to walk around the machine in putting on and taking off the shoes before and after making the adjustment, thus wasting effort and time, as well as making it difficult for the operator to examine the shoes during the stretching operation.

The object of this invention is to improve the construction of the stretching device, to simplify the stretching operation by locating the operator at the front of the machine in close proximity to the boots or shoes being stretched, and to facilitate many different stretching operations in local parts of the boot or shoe.

By providing for the manipulation of the stretching device from the front, the boot or shoe may be put on or taken off easier, and locates the operator adjacent thereto, so that he may watch and test the stretching action during the adjustment of the machine, without the necessity for walking around the machine either to make the adjustment or to observe or test the shoe.

A variety of adjustments are made possible at different local points of the boot or shoe not only by the adjusting device itself but also by the application thereto of various attachments designed to accomplish the local adjustments.

A preferred embodiment of the invention is shown in the accompanying drawings, in which:

Fig. 1 is a front elevation of a supporting stand having the adjusting device applied thereto;

Fig. 2 is a similar view partly in section on the line 2—2 of Fig. 5;

Fig. 3 is a perspective view of a boot leg adjusting device;

Fig. 4 is a horizontal sectional view through the boot and shoe adjusting device applied to the stand, on the line 4—4 of Fig. 1;

Fig. 5 is a side elevation thereof partly in section;

Fig. 6 is a partial vertical cross section therethrough on the line 6—6 of Fig. 5;

Fig. 7 is a detail horizontal section therethrough on the line 7—7 of Fig. 5;

Fig. 8 is a side elevation of the adjusting device taken at the opposite side from Fig. 5, and with parts broken away and in section;

Fig. 9 is a disassembled perspective view of the lower portion of the foot adjusting device, partly broken away and in section;

Fig. 10 is a perspective view of a toe stretching unit;

Fig. 11 is a perspective view showing one form of bunion stretcher;

Fig. 12 is a perspective view of an instep and vamp stretching device;

Fig. 13 is a side elevation of another form of bunion piece or stretcher;

Fig. 14 is a top plan view thereof;

Fig. 15 is a detail perspective view partly in section, of the lower portion of the leg extension member;

Fig. 16 is a cross-section therethrough; and

Fig. 17 is a perspective view of the spreading block used therein, detached.

The invention is shown as applied to a supporting stand, although it will be evident that the stretching device may be secured either singly or in pairs on any suitable support, such as a stand, workbench, post, or the like and held at any angle desired by the user. Stretching devices may be provided for both boots or shoes of a pair, but only the left stretching device is illustrated in Fig. 1, although the stand is capable of supporting a pair of such devices. The supporting stand is designated generally by the numeral 1 and may be of a variety of shapes, one of which is shown in Figs. 1 and 2. The stand is provided with a suitable base preferably having openings 2 therein (Fig. 5) for securing the same to the floor or other suitable foundation. The stand 1 is shown as provided with body openings therein, the bottoms of which form shelves 3 and 4 for supporting accessories or other elements, as may be desired. The top of the stand is formed with a supporting tray 5 (Fig. 4) for holding boots and shoes before and after adjusting, as may be desired.

The stand shown is adapted to be interposed between a pair of adjusting devices for both boots or shoes of a pair, only the left adjusting device being shown for purpose of illustration, but it will be understood that the right device may be similarly constructed for corresponding fitting of the right shoe of the pair.

As shown in Figs. 1, 2 and 4, the adjusting device is provided with a supporting head 6, which is secured in abutting relation against one side of the stand 1 and detachably fastened thereon by a bolt 7, extending through an opening 8 in the head 6 and threaded into a hole 9 in the stand, although it will be obvious that a bolt may be used in place of a screw and extending through said holes, if desired.

The head 6 has a depending bar 10, extending downwardly therefrom along the stand 1, the lower end of which bar 10 is provided with a supporting bracket 11, having a hole 12 therein to receive an arm 13 of the heel rest 14 (Figs. 1, 2 and 5). The hole 12 is drilled oversize in the bracket 11, and at an oblique angle inclined outwardly toward the bottom, so that the arm 13 will fit loosely therein, but when the heel rest 14 is arranged at right angles to the bar 10, the arm 13 will bind sufficiently to hold the heel rest in place without slipping. The bracket 11 may be provided with a spring dog shown generally at 15 in a side of the hole 12 to bear against the arm 13 for holding the heel rest frictionally in adjusted position in the hole.

At one side of the head 6 is a body member designated generally by the numeral 16 which body member is elongated and is adapted to be secured in abutting relation against a side of the head 6 and against guide arms 17 shown as formed integrally with the head 6 and extending rearwardly therefrom. These parts may be secured together by screws extending through orifices 18 and into the body member 16. The body member 16 has a groove in the inner face thereof forming a guideway 19 in cooperation with the opposed portion of the head 6 and guide arms 17, which guideway 19 has a lug 20 at one side thereof at its forward end, as shown in Figs. 2, 4 and 8.

As shown in Figs. 1, 5 and 8, the stretching device includes a leg extension member designated generally by the numeral 21, which is shown as of sufficient length to receive a boot leg, as well as a shoe top, although this member may be of any desired length. The leg extension member 21 is supported by a sliding arm 22 secured to the upper end thereof and which extends into the guideway 19, being slidably mounted therein. The slide arm 22 has an offset lug 23 at the back end thereof which bears in sliding relation against the guide arms 17. This lug 23 is in position to engage the head 6 upon forward adjustment of the leg member 21, for limiting the forward sliding movement of the slide arm 22 relative to the guideway 19.

The leg extension member 21 is adapted to be adjusted forwardly relative to the head 6 by an adjusting screw 24. The screw 24 is journaled in an orifice 25 in one side of the upper end of the leg member 21, orifice 25′ in the head 6 (Fig. 4), and in an orifice 26 in the lug 23, capable of rotation relative thereto. A crank 27 is fixed to the forward end of the screw 24 by a pin 28 passing through aligned orifices in the crank 27 and screw 24 for rotating the screw. A nut 29 is threaded on the screw 24 and is disposed within a recess 30 (Figs. 2, 4 and 8) in a side face of the head 6, so as to hold the nut 29 against rotary or axial movement. The screw 24 extends through the orifice 25′, so that upon rotation of said screw by the crank 27, the screw is moved bodily through the nut 29 and thereby moves the slide arm 22 within the guideway 19, and the leg adjusting member 21 forwardly or backwardly relative to the head 6.

Formed integrally with the lower end of the leg extension 21 is a shoe support 31 which extends at an angle thereto, preferably substantially in a horizontal direction. The support 31 forms one side of the stretching device for the forward portion of the shoe, it being adapted to cooperate with a coacting supporting and stretching foot member 32 disposed beside the support 31. The member 32 is removable and may be replaced by members of various sizes, but the support 31 may be caused to fit different sized shoes by the insertion thereover of a sleeve 33 (Fig. 9), the size of which may be made to conform with the size of the shoe to be adjusted.

The foot member 32 is supported by a shaft 34 which extends lengthwise of the leg member 21 at an acute angle thereto, and has a forwardly turned lower end 35 that is received in a hole 36 in the foot member 32, detachably mounting said foot member thereon. A notch 37 (Fig. 9) is formed in the back end of the foot member 32 to embrace the shaft 34, whereby to hold the foot member in proper position against turning on the out-turned end 35 of the shaft. The shaft 34 is journaled for turning movement about an upright axis, as well as mounted for bodily swinging movement laterally, having its lower end portion confined by a bracket 38 (Figs. 4, 6 and 15) attached to the leg member 21, while the upper end portion of said shaft extends through and is loosely mounted in an appreciably larger opening 39 formed in a bracket 40 secured to the upper end of the leg member 21 and projecting laterally therefrom.

As shown in Figs. 15 and 16, the leg extension member 21 has an offset portion forming a groove 21a therein extending lengthwise thereof, through which the shaft 34 extends, and when the lower end portion of said shaft 34 has been swung inward against the leg member 21, it extends at an acute angle to the length of the member 21 (Fig. 6). Due to the enlarged size of the opening 39, the shaft 34 is capable of bodily lateral swinging movement relative to the member 21, having its lower portion guided by the bracket 38. The angle of the shaft 34 causes the foot-piece 32 to move outwardly and downwardly thereby causing the foot piece 32 to twist or roll outwardly as it is being moved away from the support 31. The swinging and downward movement of the shaft end 35 tends to apply pressure to the top part of the boot or shoe as well as to the inseam thereof.

To facilitate the bodily swinging movement of the shaft 34 relative to the member 21, a spreading block 38a is provided as shown in Figs. 15 to 17, capable of being inserted in the groove formed by the sides 21a and 21b and between the shaft 34 and the adjacent side 21b of the groove. The block 38a is of angular shape, as shown in Fig. 17, capable of resting on the bracket 38 and coacting therewith to form a bearing for the shaft 34, when in place. When the block 38a is moved downward by hand between the shaft 34 and the adjacent side wall 21b of the groove, it causes an outward swinging movement of the shaft from the position shown in Figs. 1 and 5 to the position shown in Fig. 15, to spread apart the member 32 from the member 31, thereby making it possible to stretch the back part of the vamp of the boot or shoe instead of the toe portion thereof. This arrangement also makes possible the stretching of a greater variety of sizes of boots or shoes with one stretching device.

As shown in Fig. 6, a crank arm 41 is formed on the upper end of the shaft 34 above the bracket 40, the end of which arm is received between a pair of ears 42 formed on the underside of a spreader cap 43. The cap 43 has an orifice 44 in one end thereof, opposite from the ears 42, receiving a pivot bolt 45 that is threaded into an orifice 46 in the top of the bracket 40, thus pivotally supporting the cap 43 for swinging movement. A leaf spring 47 has one end thereof pivotally mounted on the screw 45, while the opposite end thereof has a concave portion 48, embracing the top of the arm 41 and bearing downward thereon, tending to maintain the shaft 34, 41, seated in the opening 39 (Fig. 6), and swinging the lower portion of the shaft 34, end 35, and foot 32, substantially to a central position. The arm is adjusted by a screw 49 which extends through openings 50 in the ears 42 and through an opening 51 and a slot 52 in flanges at the upper edges of the bracket 40. A nut 53 threaded on the screw 49 is received between the ears 42. A crank 54 is fixed to the screw 49 by a pin 55 passing through orifices in the screw 49 and the crank 54 for rotating the screw, and moving the nut 53 thereon to swing the cap 43 with the arm 41, thereby swinging the foot member 32 toward or from the support 31.

Extending parallel with the leg member 21 and spaced therefrom is a heel piece 56 (Figs. 2, 5 and 8), having its lower end adapted to engage within the heel of the boot or shoe. This heel piece 56 is elongated corresponding with the leg member 21 to extend through the leg of a boot, while also being capable of engaging and adjusting a shoe. The upper end portion of the heel piece 56 is of channel shape, as well as being slotted to receive therethrough the slide arm 22, but the heel piece 56 is supported from the body member 16 by means of a relatively weak coiled spring 57 which is connected at 56' between the heel piece 56 and a lug 58, at the lower end of a depending arm 59 on the body member 16.

The spring 57 has sufficient strength to hold the heel piece 56 in raised position while the machine is not in use or while the boot or shoe is being put in place on the toe part of the machine for stretching or lengthening; then the heel piece, which is being held in raised position, is lowered into the shoe, and the crank 27 is turned until the shoe is in frictional engagement with the heel piece 56. The friction against the shoe will be sufficient to keep the spring 57 from raising this piece 56 upward while setting the heel rest 14 snugly beneath the heel of the shoe or boot being stretched or lengthened. During the stretching operation, the heel piece will remain in the shoe in the position to which it has been adjusted until the machine is loosened to the extent that pressure is no longer applied on the shoe, when the spring will cause the heel piece 56 to move upward and allow the shoe to be readily removed from the stretching device.

Thus, the heel piece 56 is capable of vertical adjustment, and slides up and down relative to the depending arm 59 which it embraces, as shown in Figs. 2 and 5. The upper end portion of the heel piece 56 bears at its back face against a lug 60 formed on the side of the body member 16, while the front of the back edge of the heel piece 56 near its upper end is in position to engage an adjusting screw 61 (Fig. 5) which may be moved in or out relative to the depending arm 59 to adjust the angle of the heel piece. The heel piece 56 is guided on one side by the body member 16 and on the other side by the lug 20 and a similar lug on the body 6 which is positioned thereabove.

The operation of the adjusting device will be obvious from the foregoing description, taken with the drawings. The foot piece 32 may be selected and applied to the offset end 35 of the shaft 34 according to the size of the boot or shoe to be adjusted. Likewise, a sleeve 33 may be selected if required and applied over the foot stretching member 31. Then with the leg member 21 adjusted in relatively close proximity to the heel piece 56, the boot or shoe may be applied to the stretching device, and the heel piece 56 brought down to a point where it rests against the insole and against the inside of the upper at the back of the shoe. Then upon operation of the crank 27, the screw 24 will be moved forwardly through the nut 29 which is confined stationary in the recess 30, causing bodily forward movement of the leg 21 and the foot pieces 31 and 32 relative to the heel piece 56, thereby applying lengthwise stretching to the article of foot wear.

If transverse stretching is desired, this may be accomplished by manipulation of the crank 54 in a direction to feed the nut 53 on the screw 49, to the rear, thus swinging the cap 43 and crank arm 41 in a direction to rotate the shaft 34 about an upright axis and thereby swing the end 35 laterally, so as to move the stretching member 32 away from the member 31. These stretching actions longitudinally and transversely may be accomplished by the operator either successively or alternately, as desired, until the required stretching of the shoe is obtained. Thereafter the article may remain on the stretching device until it has set sufficiently when it may be removed by reversing these actions.

In addition to accomplishing longitudinal and transverse stretching of the article of footwear by the manipulations described above, various localized stretching actions may be obtained by the use of accessories, some of which are illustrated in Figs. 3 and 10 to 14.

As shown in Figs. 1, 5, 8 and 19, the foot piece 32 is provided with a series of recesses 62, each of which is preferably square and arranged diagonally in adjacent corner-to-corner relative to the length of the foot piece. This provides for ready adjustment of bunion pieces that may be applied thereto for localized stretching actions, which pieces may be readily adjusted lengthwise of the foot piece 32, according to the selected recess 62.

Fig. 11 shows a bunion piece 63 applied to the foot piece 32 for stretching the top edge of the foot portion of the boot or shoe, or for lifting up the toe cap as to relieve an ingrown toe nail.

The bunion piece 63 is secured in place by an angular lug 64 attached thereto for insertion into a selected recess 62, according to the desired position of the bunion piece. A spring 65 may be provided on the lug 64, if desired, for resiliently holding the lug in place in the recess 62.

Figs. 13 and 14 show another form of bunion piece, designated generally by the numeral 66, which extends across the foot pieces 31 and 32. The bunion piece 66 is elongated as shown in Fig. 14 and is curved lengthwise, as shown in Fig. 13, so as to engage over the foot pieces, whereby it is raised into lifting engagement with the top of the cap or toe portion of the boot or shoe as these members are spread apart. The bunion piece 66 has a rib 67, extending lengthwise of the underface thereof and bearing upon the foot piece 31, so as to reduce the friction therebetween. A lug 68 having a retaining spring 69 is mounted at one end of the bunion piece 66, in position to engage selectively in one of the recesses 62 for holding the bunion piece in place thereon. Additional recesses 70 may be provided along the upper face of the bunion piece 66, if desired, for securing auxiliary stretching elements thereto.

Fig. 12 shows an instep and vamp stretcher designated generally 71 which is adapted to be mounted with the forward end thereof resting on the upper side of the foot pieces 31 and 32. The vamp stretcher 71 may be held in place by a lug 72 on the back end thereof which may be fitted selectively in any one of the holes 73 (Fig. 9) formed in the front face of the leg member 21. The vamp stretcher 71 may be provided also with a row of recesses 74 for receiving an additional bunion piece thereon.

Provision may be made for stretching the toe portion of the article of foot wear by means of a stretching and lengthening unit of the character shown in Fig. 10, which is shown as applied to and operated by the foot pieces 31 and 32. This toe stretching unit includes toe pieces 75 and 76 pivotally connected together at 77 for relative swinging movement. The toe piece 75 has its back end bifurcated, with prongs 78 and 79 of different lengths, adapted to engage selectively in a hole 80 formed at the lower end of the leg member 21. Either of the prongs may be engaged in said hole according to the disposition of the toe pieces relative to the leg member, the prong 78 being of greater length than the prong 79 and disposing the toe pieces further forward to accommodate a shoe of greater length. The toe piece 76 has a hook 81 thereon which embraces the foot piece 32, so as to operate the toe piece during the spreading movement of the foot pieces 31 and 32. Recesses 82 are shown as formed in different positions in the toe piece 75 to receive and accommodate bunion pieces thereon for stretching wide toes of boots or shoes, when such auxiliary stretching actions are desired.

Referring to Figs. 2, 3, 5 and 7, this shows leg stretching elements for a pair of boots, comprising leg pieces 83, having curved lower end portions 84 which may be provided with recesses 85 for receiving localized bunion pieces if desired. One of the leg pieces 83 is shown as provided with an adjustable screw 86 in position to bear against a lug 87 on the coacting leg piece to vary the spacing therebetween. The leg pieces 83 are disposed laterally on either side of the leg piece 21 and heel piece 56, after the boot is on the stretcher, with the adjusting screw 86 passing therebetween. When it is desired to stretch the side seams or to "tree out" boots, the bolt 86 is adjusted outwardly against the lug 87 so as to spread leg pieces 83 apart, and the adjusting crank 27 is turned to move the leg piece 21 forward until a stretching action is applied to the boot leg. In so doing, the boot leg will be stretched tightly against leg pieces 83, so as to stretch adequately the leg of the boot to "tree out" the side seams of the boot leg.

After the stretching action described above, the shoe may be removed from the stretching device to a holding accessory which will retain the stretched condition of the shoe. Such a holding accessory is set forth and claimed in my application on "Boot and shoe holding trees," filed October 11, 1943, Ser. No. 505,828.

I claim:

1. In a stretcher for footwear, the combination of a support, stretching devices arranged for bearing against the respective front and back portions of the footwear, means mounting front stretching device for bodily movement in a direction longitudinally of the footwear relative to the other stretching device, screw means extending horizontally in the direction longitudinally of the footwear and connected with said movable mounting means for adjusting said adjustable device and extending to the front thereof, and means adjacent the front of said adjustable device for operating said screw means.

2. In a stretcher for footwear, the combination of a support, stretching devices arranged for bearing against the respective front and back portions of the footwear, a guideway secured to said support, slide means carrying the front stretching device and mounted in the guideway for movement of the last-mentioned stretching device relative to another stretching device, and means for moving said slide means relative to the guideway, said moving means extending to the front of the movable stretching device, and means connected with said moving means and located adjacent the front of the stretching device for operating the moving means.

3. In a stretcher for footwear, the combination of a support, stretching devices arranged for bearing against the respective front and back portions of the footwear, a guideway carried by the support, sliding means mounted in the guideway for movement relative thereto and carrying the front stretching device, a screw device connected with the slide means and extending longitudinally of the guideway to the front of the movable stretching device for operating said slide means, and means adjacent the front of the movable stretching device for operating the screw device.

4. In a stretcher for footwear, the combination of a support, stretching devices arranged for bearing against the respective front and back portions of the footwear, a guideway secured to said support, slide means carrying the front stretching device and slidably mounted in the guideway for movement longitudinally relative thereto, a screw device connected with said slide means and extending to the front of the movable stretching device, and a rotatable member located adjacent the front of the movable stretching device and connected with the screw device for operating the same to move one of said stretching devices longitudinally relative to another of said stretching devices.

5. A stretcher for footwear comprising a pair of stretching devices arranged for bearing against the respective front and back portions of the footwear, a body having means for supporting the back stretching device, said body having a guideway connected therewith, a support carrying the front stretching device and having a slide arm connected thereto slidably mounted in said guideway, a shaft having screw-threaded connections with said slide arm and extending therefrom to the front portion of the movable stretching device, and a crank secured to said shaft at the forward end thereof for rotating the same.

6. In a stretcher for footwear, the combination of a leg member carrying a stretching device at the front thereof, an arm extending rearwardly from said stretching device, means forming a guideway slidably receiving said arm, a screw device spaced laterally from the arm and leg member and having operative connection with the arm for moving the leg member, and means at the front of the leg member for operating said screw device.

7. In a stretcher for footwear, the combination of a leg member carrying a stretching device at the front thereof, an arm extending rearwardly from said stretching device, means forming a guideway slidably receiving said arm, a head extending laterally from said means and having an orifice therethrough, a lug attached to the leg member and extending laterally therefrom with an orifice therein, a screw device having an operative connection with said arm and extending through said orifice to the front of the leg member, and means at the front of the leg member connected with said screw device for operating the same.

8. In a stretcher for footwear, the combination of a leg member carrying a stretching device at the front thereof, an arm extending rearwardly from said stretching device, a body member having a guideway therein slidably receiving said arm, a head connected with said body member and extending laterally from said guideway with an orifice therein, a lug attached to the leg member extending laterally therefrom with an orifice therein, a screw device having an operative connection with said arm and extending through said orifice to the front of the leg member, means for connecting said screw device with the head for causing longitudinal movement of the arm upon rotation of the head, and a handle device fixed to the screw device at the front of the leg member for operating said screw device.

9. In a stretcher for footwear, the combination of a leg member carrying a stretching device at the front thereof, an arm extending rearwardly from said stretching device, a body member having a guideway therein slidably receiving said arm, a head connected with said body member and extending laterally from said guideway with an orifice therein, a lug attached to the leg member extending laterally therefrom with an orifice therein, a screw device having an operative connection with said arm and extending through said orifice to the front of the leg member, means for connecting said screw device with the head for causing longitudinal movement of the arm upon rotation of the head, a handle device fixed to the screw device at the front of the leg member for operating said screw device, said head having a depending bracket member beside the leg member with a seat therein, and a rest detachably mounted in said seat for supporting a portion of the footwear on the stretching device.

10. A stretcher for footwear comprising a pair of stretching devices, a body having a guideway connected therewith, means for resiliently supporting one of the stretching devices on the body, and means for mounting the other stretching device in the guideway for bodily movement toward and from the first-mentioned stretching device.

11. A stretcher for footwear comprising a pair of stretching devices, a body, means for resiliently supporting one of the stretching devices on the body, and means for mounting the other stretching device on the body for adjustment relative to the first-mentioned stretching device.

12. A stretcher for footwear comprising a pair of stretching devices adapted for bearing against the respective front and back portions of the footwear, a body having a depending arm, one of said stretching devices extending lengthwise of said depending arm, resilient means supporting said stretching device on the arm for vertical movement relative thereto, means holding said stretching device in upright position, and means mounting the other stretching device on the body for adjustment toward and from the first-mentioned stretching device.

13. In a stretcher for footwear, the combination with a support, of stretching devices carried by the support, an upwardly extending supporting member for one of the stretching devices, and means mounting the other of the stretching devices on the support for lateral and downward swinging movement relative to the first-mentioned stretching device about an axis extending in a direction downwardly lengthwise of the supporting member of the first-mentioned stretching device and at an acute angle to said supporting member.

14. In a stretcher for footwear, the combination with a support, of stretching devices adapted for relative movement and carried by the support, means mounting one of the stretching devices for movement laterally relative to the other, said mounting means including a shaft connected with the movable stretching device and having a crank arm connected therewith, and screw means connected with said crank arm and extending to the front of the stretching device for operating the mounting means.

15. In a stretcher for footwear, the combination of a pair of stretching devices, means mounting one of said stretching devices for movement laterally relative to the other, said mounting means including a shaft connected with the movable stretching device and having a crank arm thereon, a lever member extending lengthwise of said crank arm and having ear portions embracing said crank arm, and screw means operatively connected with said lever member for moving the same to turn the shaft.

16. In a stretcher for footwear, the combination of a pair of stretching devices, means mounting one of said stretching devices for movement laterally relative to the other, said mounting means including a shaft connected with the movable stretching device and having a crank arm thereon, a lever member extending lengthwise of said crank arm and having ear portions embracing said crank arm, a nut housed between said ear portions, and a screw operatively connected with said nut for moving the lever member and shaft.

17. In a stretcher for footwear, the combination of a pair of stretching devices, a leg member having one of the stretching devices fixed thereto, and means mounting the other stretching device for movement laterally relative to said fixed stretching device, said mounting means including a shaft connected with the movable stretching device and having a crank arm extending transversely thereof, a bracket fixed to the leg member and extending transversely thereof, a lever member pivoted at one end to the bracket and having ear portions thereon embracing the crank arm, a nut between the ear portions, and a screw member threaded through said nut for operating the lever member to move the shaft and stretching member.

18. A stretcher for footwear comprising a leg member having an offset foot portion rigidly and integrally secured thereto, a coacting stretching device adjacent to said foot portion, and a foot portion detachably mounted on said stretching device and coacting with the first-mentioned foot portion.

19. A stretcher for footwear comprising a support having a foot portion rigidly and integrally secured thereto, a shaft connected with said support and having an offset end adjacent the foot portion, and a stretching member detachably mounted on said shaft in position for coaction with the foot member.

20. A stretcher for footwear comprising a pair of coacting stretching devices adapted to bear against a portion of footwear and elongated lengthwise thereof, means mounting said stretching devices for lateral expanding movement relative to each other and an elongated bunion piece extending transversely over the stretching devices and having means at an end thereof for detachably connecting said bunion piece with one of the stretching devices.

21. A stretcher for footwear comprising a pair of coacting stretching devices adapted to bear against a portion of footwear and elongated lengthwise thereof, means mounting said stretching devices for lateral expanding movement relative to each other, an elongated bunion piece extending transversely over the stretching devices and having means at an end thereof for detachably connecting said bunion piece with one of the stretching devices, and means connected with the opposite end portion of said bunion piece for causing a raising movement thereof upon spreading movement of the stretching devices.

22. A stretcher for footwear comprising a pair of stretching devices, means mounting one of said stretching devices in fixed position and the other of said stretching devices for spreading movement relative thereto, toe stretching members connected together for relative spreading movement, and means connecting one of the toe stretching members in fixed position and the other toe stretching member with the movable stretching device for operation thereby.

23. A stretcher for footwear comprising a leg member, a pair of stretching devices one secured rigidly to the leg member, means mounting the other stretching device for swinging movement relative thereto, toe stretching members connected together for relative spreading movement, means for rigidly securing one of said toe stretching members to the leg member, and means secured to the other toe stretching member and detachably connected with the movable stretching device for operation thereby.

24. A stretcher for footwear, comprising a pair of stretching devices, means mounting said stretching devices for relative spreading movement, toe stretching members connected together for relative spreading movement, means for actuating the toe stretching members, and means for connecting the toe stretching members with the stretching devices and for adjusting the same longitudinally to different positions relative thereto.

25. In a stretcher for footwear, the combination with a support, of stretching devices adapted for relative movement and carried by the support, means mounting one of the stretching devices for movement laterally relative to the other, said mounting means including a shaft connected with the movable stretching device, and means supporting said shaft for bodily swinging movement thereof relative to the other stretching device.

26. In a stretcher for footwear, the combination with a support, of stretching devices adapted for relative movement and carried by the support, means mounting one of the stretching devices for movement laterally relative to the other, said mounting means including a shaft connected with the movable stretching device, and means supporting said shaft for bodily swinging movement thereof relative to the other stretching device, and bearing means detachably holding said shaft in adjusted position.

27. In a stretcher for footwear, the combination with a support, of stretching devices carried by the support, a shaft mounting one of the stretching devices on the support, and means supporting said shaft for tilting movement thereof transversely of the length of said shaft relative to its support.

28. In a stretcher for footwear, the combination with a support, of a pair of stretching devices, means for supporting one of said devices on the support, means for supporting the other of said devices on the support and for bodily movement of the last-mentioned device toward and from the first-mentioned device, and means for turning the second-mentioned device to different angular positions relative to the first-mentioned device in any bodily adjusted position thereof.

29. In a stretcher for footwear, the combination of a pair of foot stretching devices, a leg member supporting one of said stretching devices, a shaft extending beside the leg member and supporting the other of said stretching devices, and means mounting said shaft for bodily swinging movement toward and from the leg member to adjust the relative positions of the stretching devices.

30. In a stretcher for footwear, the combination of a pair of foot stretching devices, a leg member supporting one of said stretching devices, a shaft extending beside the leg member and supporting the other of said stretching devices, means mounting said shaft for bodily swinging movement toward and from the leg member to adjust the relative positions of the stretching devices, and means operative connected with said shaft for rotating said shaft and turning the second-mentioned stretching device relative to the first-mentioned stretching device in different relatively adjusted positions thereof.

31. In a stretcher for footwear, the combination of a pair of foot stretching devices, a leg member supporting one of said stretching devices, a shaft extending beside the leg member and supporting the other of said stretching devices, means mounting said shaft for bodily swinging movement toward and from the leg member to adjust the relative positions of the stretching devices, and a block detachably bearing against the shaft in an outward position and holding the same in place.

32. In a stretcher for footwear, the combination of a pair of foot stretching devices, a leg member supporting one of said stretching devices, a shaft extending beside the leg member and supporting the other of said stretching devices, means mounting said shaft for bodily swinging movement toward and from the leg member to adjust the relative positions of the stretching devices, said leg member having a laterally projecting guideway at one side thereof receiving the shaft therein for said swinging movement, and a block detachably mounted in the guideway between the leg member and shaft and holding the shaft laterally disposed relative to the leg member.

33. In a stretcher for footwear, the combination of a support having a guideway thereon, a stretching device for the front portion of a shoe and having slide means mounted in said guideway for bodily movement of the stretching device relative to the support, a stretching device for the rear portion of the shoe carried directly by the support and arranged adjacent the first-mentioned stretching device, a depending member carried by the support and having an opening therein arranged at an oblique angle, a heel rest having a depending arm extending in said opening and supporting the heel rest beneath the back stretching device for supporting the heel of the shoe thereon, and means operative at the front of the stretcher for adjusting the first-mentioned stretching device, whereby the operator is disposed at the shoe when the latter is mounted on the stretching device and supported by the heel rest for observing the shoe during the stretching operation.

34. In a stretcher for footwear, the combination of a support, a stretching device constructed for imparting stretching actions to footwear, and means pivotally mounting said stretching device on the support for bodily adjustment relative thereto about a substantial horizontal axis to different operative positions.

CHARLES GREGORY.